July 17, 1962  C. H. WENTWORTH ETAL  3,044,921
METHOD FOR MAKING CELLULAR CORES
Filed Jan. 10, 1956  4 Sheets-Sheet 2
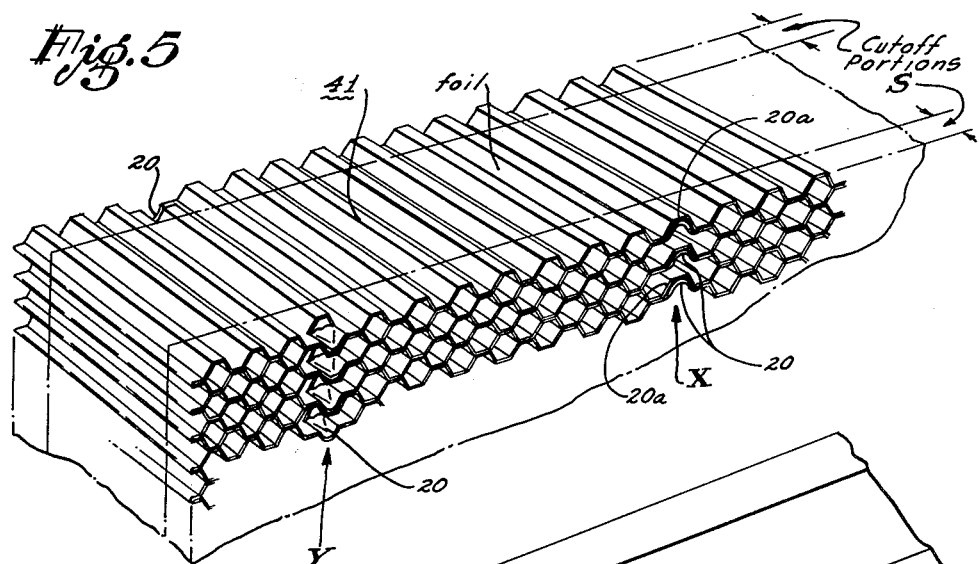
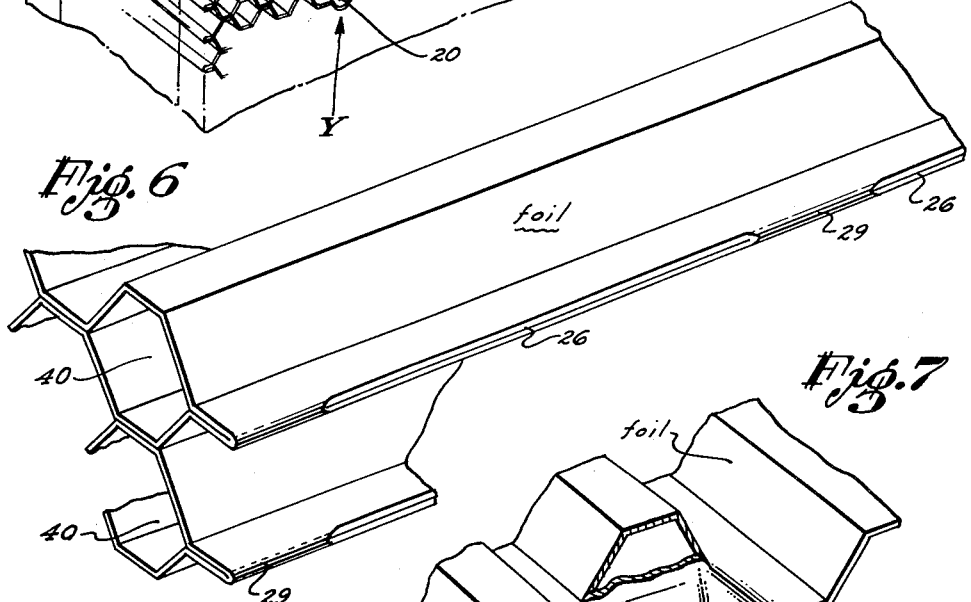
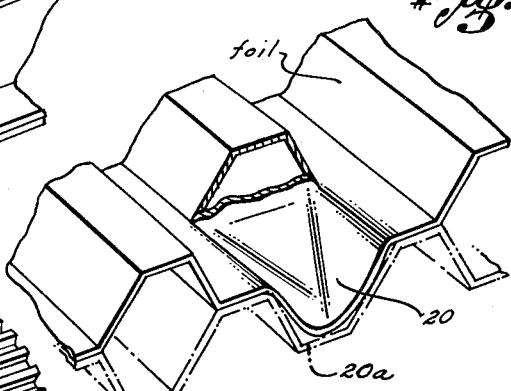
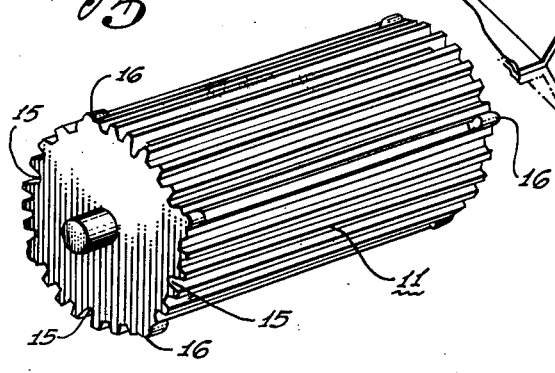
INVENTORS.
Clinton H. Wentworth
Lloyd H. Wallner
By Hubert E. Metcalf
Their Patent Attorneys

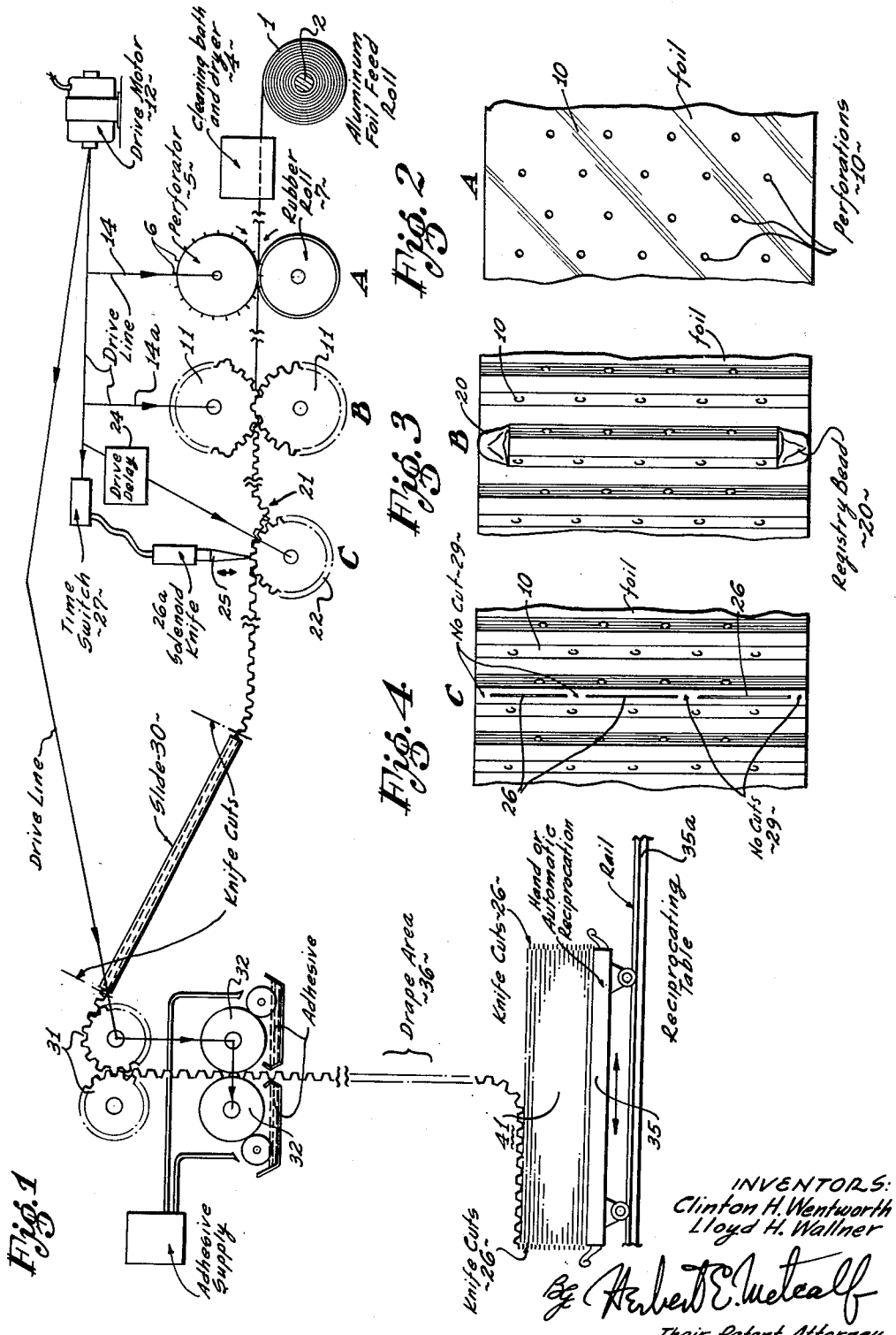

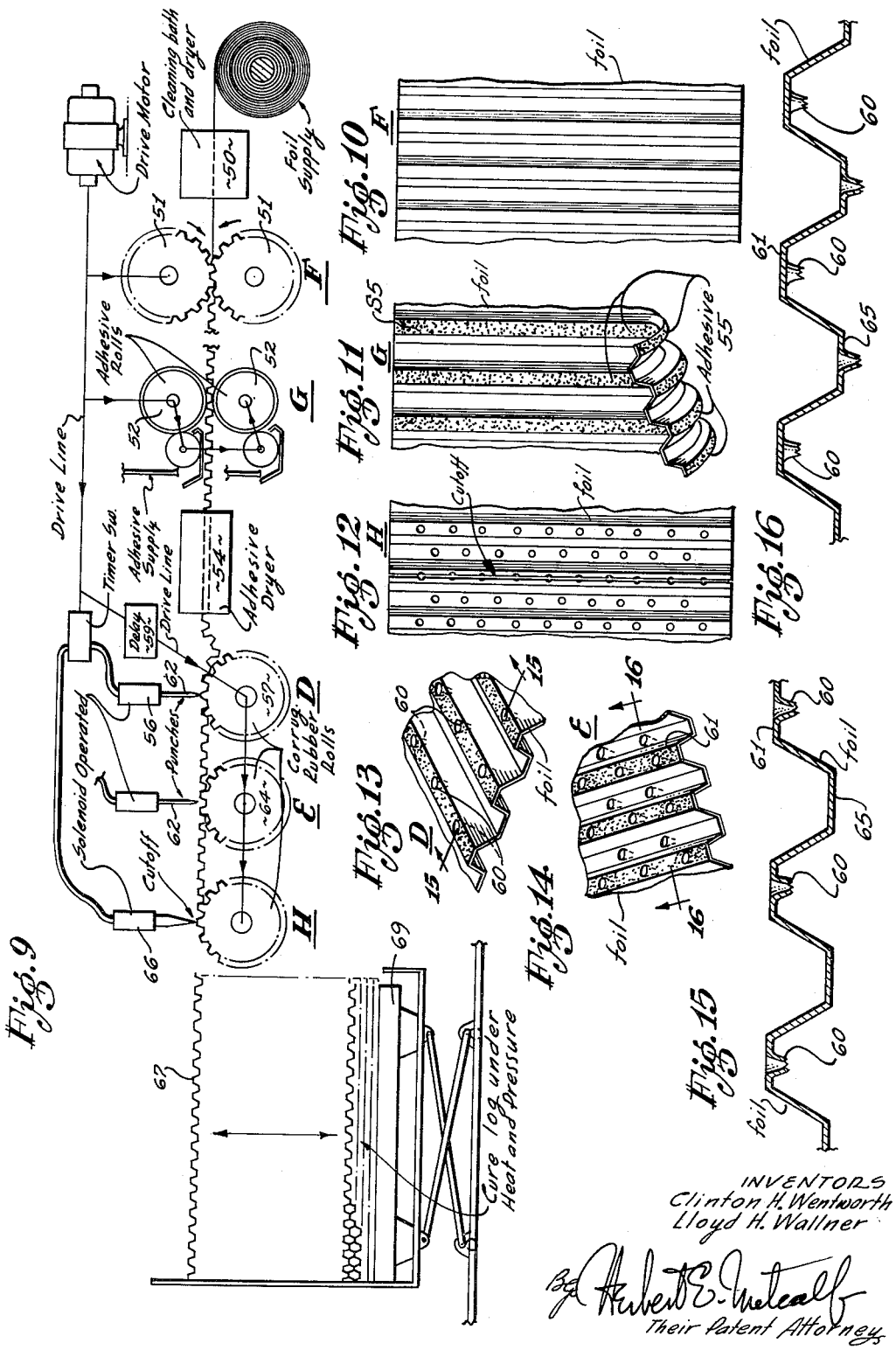

July 17, 1962 C. H. WENTWORTH ETAL 3,044,921
METHOD FOR MAKING CELLULAR CORES
Filed Jan. 10, 1956 4 Sheets-Sheet 4
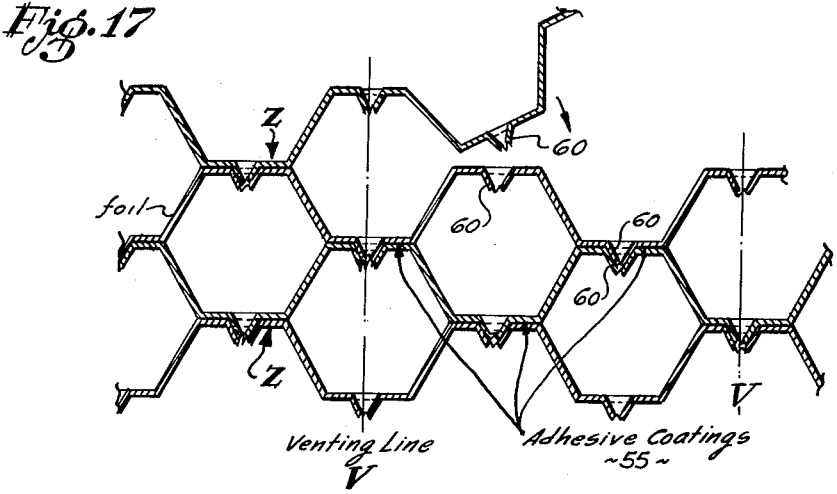
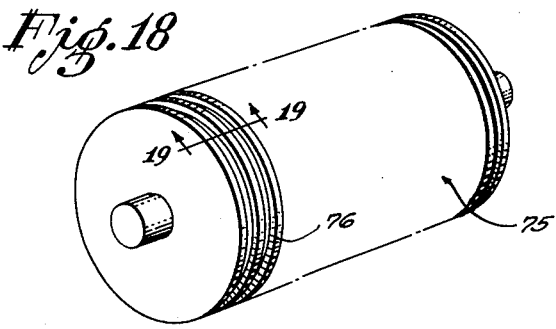
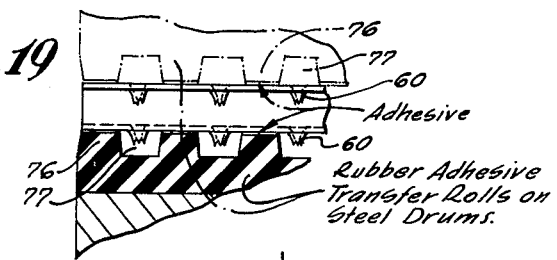
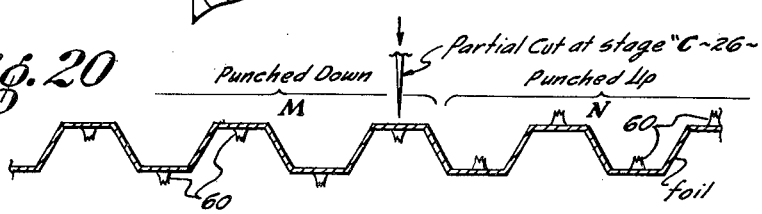
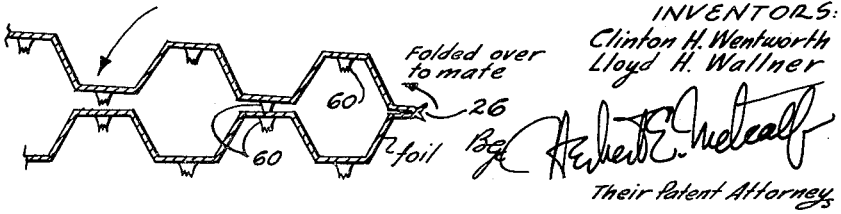
INVENTORS:
Clinton H. Wentworth
Lloyd H. Wallner
Their Patent Attorney

United States Patent Office 3,044,921
Patented July 17, 1962

3,044,921
METHOD FOR MAKING CELLULAR CORES
Clinton H. Wentworth, Los Angeles, and Lloyd H. Wallner, Temple City, Calif., assignors, by mesne assignments, to Hexcel Products, Inc., Berkeley, Calif., a corporation of California
Filed Jan. 10, 1956, Ser. No. 558,294
10 Claims. (Cl. 156—205)

Our invention relates to the formation of cellular cores and is particularly useful in building up honeycomb cores for use in honeycomb sandwich panels for structural or heat insulating members.

It was pointed out by Schlichting in his U.S. Patent No. 2,001,632 issued in 1935 and filed in 1934, that very thin metal sheets such as aluminum foils will, when shaped into a cellular core of honeycomb cellular cross section, and then sandwiched between two cover sheets and bonded thereto, produce an extremely strong structural element, and one which also has exceptional heat insulating qualities. Since that time honeycomb sandwiches both of the paper and foil type have been increasingly popular in industry and have been more and more used as structural elements in the aircraft industry and are presently produced in large quantities.

The usual method in use today for producing a honeycomb core structure is to corrugate thin foil sheets such as of aluminum, coat the outer areas or apices of the corrugations with adhesive, then stack one layer on top of another until a shape known to a core log is formed. Great care is needed in stacking the layers to insure proper registry of the corrugations, as otherwise the cells of the log will not be of uniform size or shape. After stacking, the log is placed under heat and pressure to cure the adhesive, and then the log is bandsawed to provide cores of the desired cellular depth.

When using foils only a few thousandths of an inch thick, the layers are hard to handle, deform easily, and many expedients have been used to insure proper registry, as for example the placing of hexagonal rods in each corrugation as one layer is placed on another. As the adhesive has been placed on the sheets before stacking, withdrawal of the rods not only smears the adhesive but also tends to distort and displace the already registered sheets.

The present invention is directed toward a relatively simple means and method of stacking cellular core sheets, even of thin foil, so that the sheets will automatically register when stacked, with a minimum of handling.

Among the objects of the invention are:

To provide a simple means and method for stacking cellular core sheets:

To provide such a means which will insure proper registry of the sheets to provide cells of substantially uniform size and shape:

To provide a honeycomb layer element which will mate with a similar element to register the elements so that the proper cells are formed:

To provide a honeycomb core log in which self registry of the layers has occurred during stacking:

To provide a means for mating stacked honeycomb core sheets and also serving to provide gas venting for the cells in the core:

To provide a relatively simple machine for forming honeycomb core logs from thin foil, with a minimum of manual attention:

To provide a simple means and method for forming honeycomb core logs having cells of substantially uniform size and shape:

And to provide a novel honeycomb core layer stacking means and method.

Briefly stated, our invention as to apparatus, includes means for additionally deforming thin sheets, as of aluminum foil for example, which have been corrugated in preparation to being stacked, so that these sheets may be stacked one sheet upon another with the deformed portion of one sheet entering to register with a part of another adjacent sheet. The part receiving and mating with the deformed portion may be a corrugation, or may be the inside of a deformation similar to that formed in the first sheet. It is preferred to perform the various steps of corrugating, deforming, applying adhesive and stacking in one machine layout to avoid handling of the foil sheets. One aspect of the present invention will provide a novel means and method of stacking for self registry of the layers without sheet handling.

In the drawings, which show several preferred embodiments of the present invention:

FIGURE 1 is a schematic machine layout for forming a honeycomb core log by gravity stacking, with self registry of layers.

FIGURE 2 is a top plan view of a layer element as produced at stage A in FIGURE 1.

FIGURE 3 is a top plan view of a layer element as produced at stage B in FIGURE 1.

FIGURE 4 is a top plan view of a layer element as produced at stage C in FIGURE 1.

FIGURE 5 is a perspective view of an uncured core log as produced by the machine of FIGURE 1.

FIGURE 6 is an enlarged perspective view of the log of FIGURE 5 showing the position of a hinge line.

FIGURE 7 is an enlarged perspective view of the registry means used in the log of FIGURE 5.

FIGURE 8 is a perspective view of a corrugating roll showing the means for producing registry deformations.

FIGURE 9 is a schematic machine layout, showing means for producing a combined registry and venting deformation in a corrugated sheet.

FIGURE 10 is a plan view of a layer element as produced by stage F of the machine of FIGURE 9.

FIGURE 11 is a plan view partly in perspective of a layer element as produced by stage G of the machine of FIGURE 9.

FIGURE 12 is a plan view of the layer element as produced by stage H of the machine of FIGURE 9.

FIGURE 13 is a perspective view of a layer element as produced by stage D of the machine of FIGURE 9.

FIGURE 14 is a perspective view of a layer element as produced by stage E of the machine of FIGURE 9.

FIGURE 15 is a cross sectional view taken as indicated by the line 15—15 in FIGURE 13.

FIGURE 16 is a cross sectional view taken as indicated by the line 16—16 in FIGURE 14.

FIGURE 17 is an enlarged end view showing how combined mating and venting is accomplished in a log produced by the machine of FIGURE 9.

FIGURE 18 is a perspective view of a relieved adhesive roll for applying adhesive after the mating cones have been pushed out of a layer element.

FIGURE 19 is a diagram showing how adhesive is applied by the roll of FIGURE 18 at line 19—19.

FIGURE 20 is a sectional view of a hinged foil utilizing cone registry.

FIGURE 21 is a sectional view showing hinging of the foil of FIGURE 20.

Referring first to FIGURE 1 and related FIGURES 2 to 8 inclusive, a roll of foil 1 is mounted on a shaft 2 to turn freely. This foil may be of aluminum a few thousandths of an inch thick. After passing through a cleaning bath and dryer 4 the foil is passed through perforating rolls, the upper 5 of which is provided with punches 6, the lower roll 7 being of rubber or similar elastic material. These rolls 5 and 7 actually cut out small discs of foil to provide holes 10 somewhat less than ¼ inch apart, these holes later being used as vent holes in the final sandwich (see FIGURES 2, 3 and 4). The means to perform this function is termed stage A.

The use of such vent holes in cellular sandwich construction has long been known. For example Borsodi in U.S. Patent No. 1,754,784 stated in 1930 that the cells of a cellular sandwich should be provided with openings or holes in the cell walls "to permit the escape of air in the cells of the composite board." Borsodi utilized unidirectional venting through the core, similar to the unidirectional venting herein later described in connection with the machine of FIGURE 9.

In 1934 British Patent No. 418,963 described the use of holes in the cellular walls of a sandwich core to give venting in all directions and to interconnect all of the cells and stated that "In order to avoid irregular expansions of the air which remains enclosed within the various cells of this cellular filling structure, these cells are communicated with each other through holes C' formed in the elements which compose the trellis." The holes 10 punched by rolls 5 and 7 perform exactly this function in the completed cellular sandwich.

The foil is then passed through mating corrugating rolls 11 to provide, in this example, corrugations ¼ inch on a side, a standard type in the industry. This means is termed stage B. The punching rolls 5, 7 and the corrugating rolls 11 are continuously rotated as by motor 12 through drive links 14 and 14a respectively. Details of the various drives in the machines of FIGURES 1 and 9 are not given herein as they are well known in the machine art.

The perforated foil as it emerges from stage A is shown in FIGURE 2, and is shown as it emerges from stage B in FIGURE 3.

However, it is preferred, in this machine, to provide an additional foil deformation while passing through the corrugating rolls 11. This additional deformation is formed by alternate recesses 15 and projections 16 placed around the corrugating rolls 11 at the edges thereof, as shown in FIGURE 8, the projections 16 mating with the recesses 15 as the rolls rotate, thereby pushing out the foil at the edges to form registry beads 20 as shown in FIGURES 3, 5, and 7. Alternate beads project in opposite directions. The action of these registry beads will be later described.

From the corrugating rolls 11 the foil passes first through a small loop 21 and then over a corrugated anvil roll 22 which is intermittently operated from motor 12 through a drive delay mechanism 24 (such as a geneva movement for example) to provide a slight delay of the foil at equally spaced lengths (such as 4 feet for example) of the corrugated foil. During this delay, an upper knife 25 is actuated through solenoid 26a as by a solenoid switch 27 timed from motor 12. This knife 25 cuts across the foil at the top of a corrugation and midway of the side walls of the corrugation to provide a hinge line 26. As the cut is not made entirely across the foil, no-cut portions 29 are left of sufficient length to hold the foil in line, and to function as hinges during later stacking. This cutting mechanism is termed stage C, the cut hinge line 26 being shown in plan in FIGURE 4.

After cutting the cut, the corrugated and beaded layer element is pulled up along a slide 30 by drive rolls 31 from which it passes downwardly between adhesive applying rolls 32 conventionally supplied with liquid adhesive or bonding agent such as a thermosetting resin type. The adhesive is only applied to the outer tops or apices of the corrugations, it being understood that the apices are truncated and flat. After the adhesive is applied, the foil is ready for stacking to form a log.

In this machine, stacking is performed by letting the foil drape by gravity onto a platform or table 35 movable in opposite directions on a track 35a extending at right angles to the plane of the draping layer element 36.

Table 35 can readily be moved by hand, or if desired can be reciprocated in timed relation to the layer element feed speed. In either event, the downcoming layer falls on and extends across table 35 as it is moved until a knife cut hinge line 26 is reached. At that time table movement is reversed, thereby bending the foil along the hinge line 26 as shown in FIGURE 6 in enlarged view. As the knife cuts 26 are made in the middle of a corrugation, hexagonal cells 40 are formed as the second layer drapes over the first layer. Reciprocation of the platform is continued until an uncured log 41 is formed on the platform.

It will be clearly noted that in the absence of any registering means, that while the sleazy foil elements may register to form hexagonal cells close to the hinge lines 26, between the opposite hinge lines 26 there is no assurance that proper registry of the layers will occur. In the present invention, registry over the entire length of the log is assured in this machine by the entrance of the registry beads 20 of one layer into the adjacent corrugations 20a of the next layer above and below (see FIGURE 7). The alternate up-beads and down-beads (as stacked) are displaced sidewise, as best shown in FIGURE 5 at X for the up-beads and at Y for the down-beads. This alternation is because the layers are folded and therefore are alternately reversed as to up-side and down-side of the layer elements. By alternately reversing the direction of the registry beads and properly spacing them with respect to the hinge lines, accurate registry will take place all along the log with a minimum of manual adjustment.

After the log has been formed, it is put under heat and pressure to cure the adhesive to form the final core log. After curing the log is placed in the bandsaw and a short length of cell on either side of the log is sawed off to remove the registry beads as shown at S in FIGURE 5. The remainder of the log is then available for sawing into cuts of any desired cell depth.

Another way in which registry can be obtained and one which is particularly adaptable for accurate registry of heavier foils having large cells is shown in FIGURE 9 and in related FIGURES 10 to 17 inclusive.

In this machine, the foil is passed first through a cleaning and drying bath 50 and then through corrugating rolls 51 (stage F) to provide corrugations of the desired size and shape, as shown in FIGURE 10. Liquid adhesive is then applied to the top and bottom areas of the corrugated foil as by upper and lower adhesive rolls 52 (stage G). The adhesive is then dried in an adhesive drier 54 to provide strong dry adhesive coatings 55 as shown in FIGURE 11. The dried, corrugated foil is then passed into stage D where a first solenoid operated punch 56 operates against a lower corrugated rubber roll 57 which is given a slight dwell by delay mechanism 59 while the punch is operating, to push out cone shaped projections 60 hereafter called registry cones, open at the ends thereof, from the corrugation tops 61 as best shown in FIGURES 13 and 15. The foil then passes to a second solenoid punch 62 and roll 64 where exactly the same cone shaped projections 60 are punched into the corrugation valleys 65, as shown in FIGURES 14 and 16, this latter punch and roll also acting during a dwell in the foil progression. The foil then passes to a complete cutoff knife and roll assembly 66 (stage H) where the foil is cut (see FIGURE 12) into uniform length layer elements 67. These layers 67 are stacked, as by hand, onto vertically movable platform 69 to form the core log.

As the layer elements 67 are stacked, the registry cones 60 mate as shown in FIGURE 17 to form accurate hexagonal cells 68, this mating also bringing the adhesive coatings 55 into contact as shown at Z.

The log is then placed under heat and pressure to bond the layers at the adhesive coating contact areas.

In this embodiment, as will be clearly seen from FIG-

URE 17, the registry cones, being open at their apices, provide a continuous venting path along one dimension of the cells as shown by line V in FIGURE 17. Thus the registry cones 60 have a dual function, i.e. registry and venting.

In case it is desired to apply adhesive after the registry cones 60 have been formed, adhesive rolls relieved to avoid the cones may be used. In this case the rolls will be used beyond stage H after cut-off, just before stacking. The rolls 75 as shown in FIGURES 18 and 19 are provided with ridges 76 for adhesive transfer and relief grooves 77 for reception of the registry cones 60. The adhesive coating method used in the machine of FIGURE 9 is preferred where maximum structural strength is desired, but when the strength is subordinated to other factors, such as heat insulating qualities for example, the after-coating device of FIGURES 18 and 19 is satisfactory.

While we have described the cone registry machine of FIGURE 9 as being useful for stronger foils and larger cells than those used in the machine of FIGURE 1, it should be pointed out that the cone type registry can also be used with the drape layering system of FIGURE 1. As the drape layering device of FIGURE 1 reverses each layer as it hinges, in order to use cone registry with drape layering the registry cones in each layer after stacking must point in the same direction. As the layers are reversed in folding, drape layering can be used with registry cones in the machine of FIGURE 1 by punching all of the registry cones in one direction in a length of foil between two hinge lines 26, as from the top down as shown in the machine of FIGURE 9, as illustrated at M in FIGURE 20, and then in the next length of foil up to the next hinge line 26 by punching the cones from the bottom up as shown at N in FIGURE 20 by a second set of punches timed to alternate between hinge lines. Then when the layers are folded one upon the other, all of the registry cones will mate as shown diagrammatically in FIGURE 21.

It will be obvious to those skilled in the art that the machines and method described are not limited to the production of cores of strict honeycomb shape but are capable of producing core cells of other shapes suitable for use in cellular core sandwiches.

While in order to comply with the statute, the invention has been described in language more or less specific as to structural features, it is to be understood that the invention is not limited to the specific feaures shown, but that the means and construction herein disclosed comprise a preferred form of putting the invention into effect, and the invention is therefore claimed in any of its forms or modifications within the legitimate and valid scope of the appended claims.

We claim:

1. In the method of forming a cellular core wherein transversely corrugated strips having longitudinally spaced apexes are stacked with the apexes in register and in contact to form a cellular core, the improvement which comprises forming perforated deformations in the apexes of said corrugations and thereafter stacking said strips to interengage said perforated deformations to align the apexes of said strips.

2. In the method of forming a cellular core wherein transversely corrugated strips having longitudinally spaced apexes are stacked with the apexes in register and in contact to form a cellular core, the improvement which comprises forming perforated conical deformations in the apexes of said corrugations and thereafter stacking said strips to interengage said perforated deformations to align the apexes of said strips.

3. The method of forming a cellular core which comprises moving a continuous strip in a predetermined path, forming transversely extending corrugations in said strip, forming deformations in said strip, applying adhesive to the apexes of the corrugations, forming transverse folding lines at longitudinally spaced points along the length of said strip, said deformations in said strip being formed at predetermined points along the length of said strip, stacking said strip by folding said strip back and forth along said folding lines to form a multilayer core such that the deformation in one layer engages the spaces between apexes in the adjacent layer to register said layers with the apexes in contact, and curing said adhesive to bond said layers together at said apexes.

4. The method of forming a cellular core which comprises moving a continuous strip in a predetermined path, forming transversely extending corrugations in said strip, forming perforated deformations in the apexes of said corrugations, applying adhesive to the apexes of the corrugations and stacking said strip in layers to form a multilayer core such that said perforated deformations interengage during said stacking to facilitate the registry of the apexes of said corrugations and form a core having a plurality of cells.

5. The method set forth in claim 4 wherein said adhesive is applied after the corrugations are formed and before the perforated deformations are formed, including the steps of drying the adhesive before the perforated deformations are formed and curing said adhesive under heat and pressure after said strip is stacked.

6. The method of forming a cellular core which comprises moving a continuous strip in a predetermined path, forming transversely extending corrugations in said strip, applying adhesive to the apexes of the corrugations, forming transverse folding lines at longitudinal regularly spaced points along the length of said strip, forming perforated deformations in one length of said strip extending in one direction relative to the plane of said strip, forming perforated deformations in adjacent lengths of said strip extending in an opposite direction relative to the plane of said strip and stacking said strip by folding said strip back and forth along said folding lines to form a multilayer core such that said lengths are folded back and forth to stack the strip and said perforated deformations extend in the same direction and interengage in order to maintain the apexes of the corrugations in register.

7. The method of forming a cellular core which comprises moving a continuous strip in a predetermined path, forming transversely extending corrugations in said strip, forming folding lines at longitudinally spaced points along the length of said strip, thereafter moving said strip onto a horizontal platform, reciprocating said platform horizontally while said strip is moving onto said platform, and causing said strip to be folded back and forth along said folding lines in stacked array on said platform with the apexes in one layer of said strip in registry with the apexes of an adjacent layer of said strip.

8. In the method of forming a cellular core wherein strips are transversely corrugated to form longitudinally spaced apexes, the improvement which comprises providing deformations at regularly spaced points on a strip, forming complementary depressions on an adjacent strip and stacking said strips to interengage said deformations and depressions, said deformations and depressions being located such that when they are interengaged the apexes of said strips are aligned and in register and affixing said registered areas together.

9. The method of forming a cellular core which comprises moving a continuous strip of foil in a predetermined path, forming transversely extending corrugations in said strip, forming deformations at longitudinally spaced points in said strip, applying adhesive to the apexes of the corrugations, forming folding lines at longitudinally spaced points along the length of the strip by slitting said strip, thereafter moving said strip onto a platform, reciprocating said platform while said strip is moved thereon to fold it back and forth along the folding lines thereby forming a stacked configuration on said platform, said deformation in one layer of said strip engaging the space between the apexes in an adjacent layer of said strip to facilitate the registry of the apexes of adjacent layers, and bonding the registered apexes of said strips together by the application of heat.

10. The method of forming a cellular core which comprises the sequentially performed steps of moving a continuous strip of foil in a predetermined path, forming transversely extending corrugations in said strip, applying adhesive to the apexes of the corrugations, forming transverse folding lines defined by slits at longitudinally spaced points along the length of said strip, stacking said strip by folding said strip back and forth along said folding lines to form a multilayer core with the apexes in adjacent layer aligned, and curing said adhesive to bond said layers together at said apexes.

References Cited in the file of this patent

UNITED STATES PATENTS

| | | |
|---|---|---|
| 1,263,885 | Guttridge | Apr. 23, 1918 |
| 1,546,195 | Briskin | July 14, 1925 |
| 2,117,500 | Rambush et al. | May 17, 1938 |
| 2,483,694 | Echols et al. | Oct. 4, 1949 |
| 2,518,164 | Meyer | Aug. 8, 1950 |
| 2,609,068 | Pajak | Sept. 2, 1952 |
| 2,657,044 | Apgar | Oct. 27, 1953 |
| 2,670,026 | Ungar | Feb. 23, 1954 |
| 2,704,587 | Pajak | Mar. 2, 1955 |
| 2,746,139 | Van Pappelendam | May 22, 1956 |
| 2,772,757 | Hammond | Dec. 4, 1956 |

FOREIGN PATENTS

| | | |
|---|---|---|
| 15,900 | Great Britain | Nov. 8, 1890 |